United States Patent [19]

Sakai

[11] Patent Number: 5,231,501
[45] Date of Patent: Jul. 27, 1993

[54] STILL VIDEO APPARATUS

[75] Inventor: Nobuya Sakai, Tokyo, Japan

[73] Assignee: Asahi Kogaku Kogyo Kabushiki Kaisha, Tokyo, Japan

[21] Appl. No.: 888,286

[22] Filed: May 26, 1992

Related U.S. Application Data

[63] Continuation of Ser. No. 526,722, May 22, 1990, abandoned.

[30] Foreign Application Priority Data

May 25, 1989 [JP] Japan .................. 1-132379
May 25, 1989 [JP] Japan .................. 1-132380

[51] Int. Cl.$^5$ ................ H04N 5/30; H04N 5/225
[52] U.S. Cl. .................. 358/209; 358/909; 358/906; 358/903
[58] Field of Search ........... 358/903, 909, 906, 209, 358/140

[56] References Cited

U.S. PATENT DOCUMENTS

| | | | |
|---|---|---|---|
| 4,196,450 | 4/1980 | Miller et al. | 358/903 |
| 4,652,933 | 3/1987 | Koshiishi | 358/903 |
| 4,714,962 | 12/1987 | Levine | 358/209 |
| 4,772,956 | 9/1988 | Roche et al. | 358/85 |
| 4,800,448 | 1/1989 | Kanako et al. | 358/909 |
| 4,811,118 | 3/1989 | Katoh et al. | 358/906 |
| 4,873,580 | 10/1989 | Katoh et al. | 358/906 |
| 4,876,598 | 10/1989 | Carlstedt et al. | 358/903 |
| 4,901,364 | 2/1990 | Faulkerson et al. | 358/903 |
| 4,920,503 | 3/1990 | Cook | 358/903 |
| 4,937,676 | 6/1990 | Finelli et al. | 358/906 |
| 4,943,867 | 7/1990 | Suetaka et al. | 358/906 |
| 4,985,783 | 1/1991 | Falck | 358/906 |
| 5,021,873 | 6/1991 | Abumi | 358/903 |

FOREIGN PATENT DOCUMENTS

| | | |
|---|---|---|
| 0167327 | 1/1986 | European Pat. Off. . |
| 0226959 | 7/1987 | European Pat. Off. . |
| 0269463 | 6/1988 | European Pat. Off. . |
| 0273319 | 7/1988 | European Pat. Off. . |
| 286857 | 10/1988 | European Pat. Off. . |
| 289944 | 11/1988 | European Pat. Off. . |
| 0289944 | 11/1988 | European Pat. Off. . |
| 60-049340 | 7/1985 | Japan . |
| 63-234789 | 1/1989 | Japan . |
| 2047041 | 11/1980 | United Kingdom . |
| 2059713 | 4/1981 | United Kingdom . |
| 2224905 | 5/1990 | United Kingdom . |
| 8504989 | 7/1985 | World Int. Prop. O. . |

OTHER PUBLICATIONS

English language abstracts of JP 63-234789 and 60-49340.
French Search Reports and annexes for FR App. Nos. 90 12794 and 90 06518.

Primary Examiner—Michael T. Razavi
Assistant Examiner—Wendy R. Greening
Attorney, Agent, or Firm—Sandler Greenblum & Bernstein

[57] ABSTRACT

A still video apparatus is disclosed which has a device for interfacing with an external image data processing device. The still video apparatus comprises a signal output device for outputting an electrical image signal and a signal converter for converting the image signal to an image data signal which can be processed by the external image data processing device. The apparatus is provided with an interface which outputs the image data signal to the external image data processing device. The still video apparatus may be provided with a playback device and/or a recording device, whereby a signal converting device converts an image signal, which is read from a recording medium by the playback device, to an image data signal which can be processed by the external image data processing device. In the alternative, the still video apparatus may comprise a still video camera which has a camera body wherein the camera body has a device for converting an image of an object to be photographed to an electrical image signal, a recording device for recording the image signal onto a recording medium, and a playback device for reading the image signal recorded on the recording medium. The still video camera may also be provided with an adapter which can be detachably mounted to the camera body, and which comprises a converting device for converting the image signal read from the recording medium to an image data signal which can be processed by an external processing device, and an interface which outputs the image data signal to the external processing device.

36 Claims, 7 Drawing Sheets

STILL VIDEO APPARATUS

This application is a continuation of application Ser. No. 07/526,722, filed May 22, 1990, now abandoned.

BACKGROUND OF THE INVENTION

1. Field of the Invention

The present invention relates to a still video apparatus, such as a still video camera (electronic still camera) in which picture signals of taken pictures or play-back pictures can be directly inputted to an image processing apparatus, such as a personal computer.

2. Description of Related Art

There are various known still video cameras in which pictures (images, or graphics) are recorded as electrical signals and various known still video play-back devices in which pictures taken (recorded) by a still video camera are displayed or printed. The term "still video apparatus" which will be referred to hereinafter includes both the still video camera and the still video play-back device.

In a recent computer, particularly in a personal computer, not only information of numerical values and letters, but also picture information can be processed. Picture information, for example, image data read by an image scanner, is inputted to a personal computer through a communicating interface provided in the personal computer. The communicating interface used is usually standardized (e.g. RS-232C, SCSI, etc.).

However, the standard criterion of picture outputs in a still video apparatus is not identical to the communicating interface standard mentioned above. Therefore, in order to input the recorded picture of the still video apparatus into a personal computer as image data, it is necessary to provide an image data communicating interface in the personal computer. However, since the image data communicating interface provided in the personal computer includes a signal processing circuit in addition to a similar signal processing circuit provided in the still video apparatus, the circuit arrangement becomes complicated as a whole, so that the number of signal processing steps is increased, resulting in deteriorated image signals.

SUMMARY OF THE INVENTION

The primary object of the present invention is to provide a still video apparatus having an image input/output device in which recorded image signals can be directly input to an image processing device, such as a personal computer, which has no image signal communicating interface.

To achieve the object mentioned above, according to the present invention, there is provided a still video apparatus having image signal output means for outputting an electrical image signal, comprising a signal converting means for converting the image signal to an image data signal which can be processed by an external image processing device, and an interface which outputs the image data signal to the external image processing device.

With this arrangement, the electrical image signal recorded in the still video apparatus can be input to an image processing device, such as a personal computer having no special interface for the image signal as image data.

In the case of a still video apparatus having a recording function and a play-back function, the apparatus comprises an interface which receives and transmits an image data signal from and to an external image processing device, and a signal converting means for converting the image signal which is read by the play-back means to the image data signal or converting the image data signal input from the interface to an image signal which can be recorded on the recording medium.

With this arrangement, the image data processed by the personal computer can be recorded in the still video apparatus.

The invention is also applicable to a still video camera. Accordingly, another object of the present invention is to provide a compact still video camera in which the taken picture can be input to the image processing circuit having no image interface.

To achieve the object mentioned above, according to another aspect of the present invention, there is provided a still video camera comprising a camera body which comprises an imaging means for converting an image of an object to be taken to an electrical image signal, a recording means for recording the image signal on a recording medium and a play-back means for reading the image signal recorded on the recording medium, and an adaptor which is detachably mounted to the camera body and which comprises a signal converting means for converting the image signal read from the recording medium by the play-back means to an image data signal which can be processed by an external image processing device and an interface which outputs the image data signal to the external image processing device.

With this construction, a picture can be taken by a compact still video camera when the adaptor is detached from the camera body, in a manner, similar to a conventional still video camera. When the adaptor is mounted to the camera body, the picture taken by the camera can be input to the image processing device, such as a personal computer having no image interface, as image data.

Preferably, the camera body has an external output terminal from which the image signal is output and the adaptor has an image input terminal which can be connected to the output terminal of the camera body.

BRIEF DESCRIPTION OF THE DRAWINGS

The invention will be described below in detail with reference to the accompanying drawings, in which.

DESCRIPTION OF PREFERRED EMBODIMENTS

Figure 1:
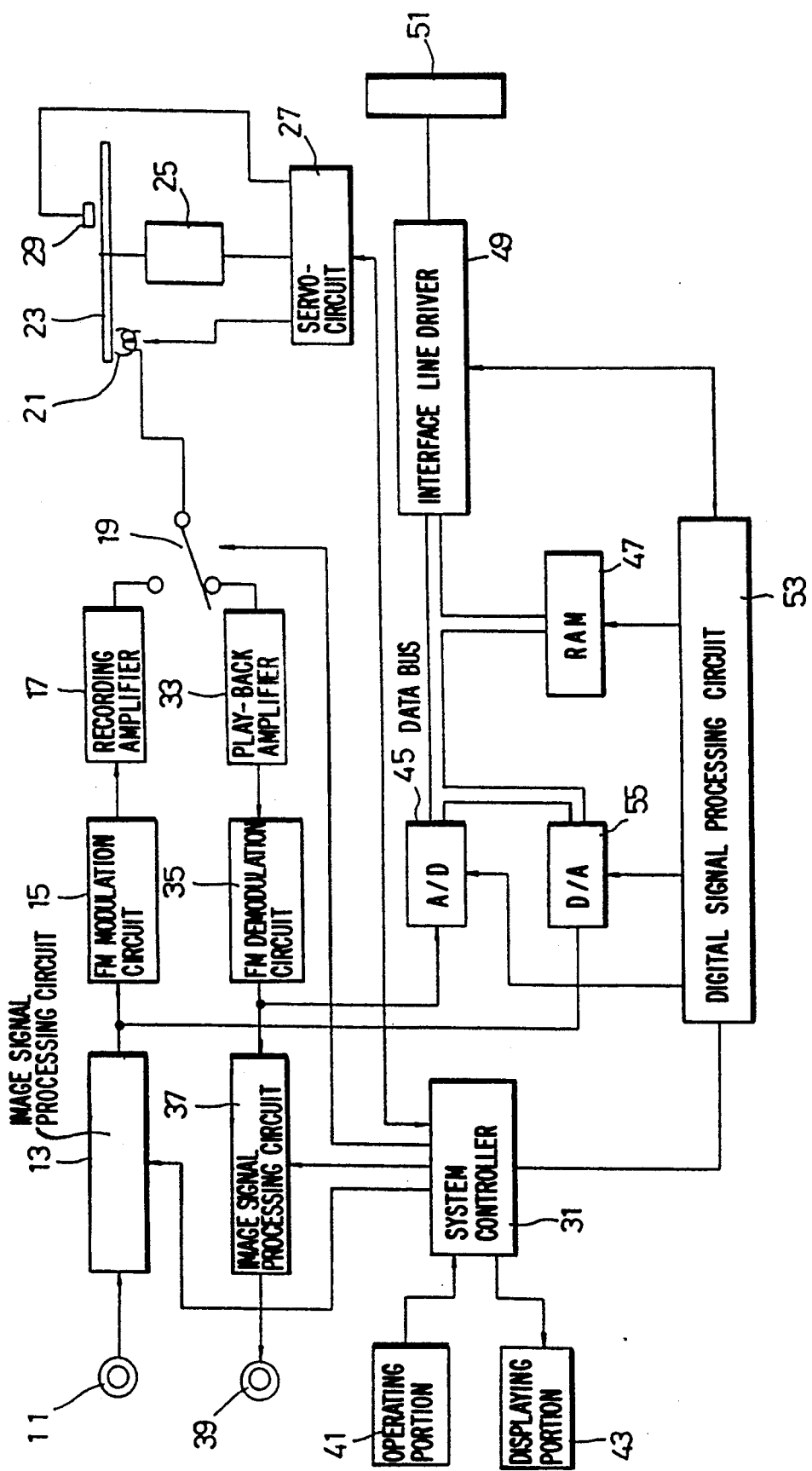
FIG. 1 is a block diagram of a first embodiment of a still video apparatus according to the present invention.

FIG. 1 shows an example of a control circuit of a still video apparatus 10 having an image signal input device according to the present invention.

A video signal, consisting of a luminance signal and a color signal, etc., is input from, for example, a still video camera (CCD imaging device), etc., to a picture input terminal 11 of the still video apparatus 10. The video signal inputted from the picture input terminal 11 is processed to be split into a luminance signal and a color signal in an image signal processing circuit 13, FM-modulated by an FM-modulation circuit 15, amplified by a recording amplifier 17, and supplied to a magnetic head 21 through a selecting switch 19. The processed signal is recorded on a predetermined track of a magnetic recording disc 23 as a recording medium by the magnetic head 21. The image signal processing circuit 13, FM-modulation circuit 15, recording amplifier 17 and magnetic head 21 constitute a picture signal recording device.

The magnetic disc 23 is rotated at a constant speed by a servo-motor 25 which is driven by a servo-circuit 27. The servo-circuit 27 controls the rotational speed of the servo-motor 25 and the tracking of the magnetic head 21, in accordance with pulse signals issued from a PG coil 29.

The operation of the picture signal processing circuit 13, the switching operation of the selecting switch 19, and the motor control and the tracking control of the servo-circuit 27 are effected by a system controller 31. The system controller 31 usually comprises a microcomputer which generally controls the operations of the components or devices of the still video apparatus, in accordance with a program stored in an internal ROM incorporated in the microcomputer.

Figure 4:
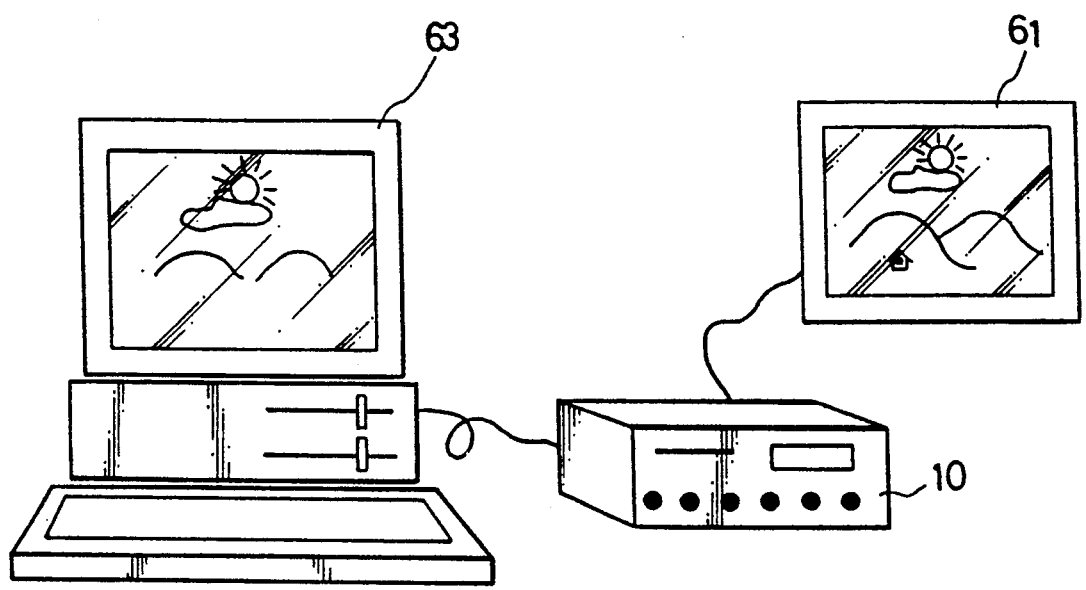
FIG. 4 is a schematic view of a still video apparatus, a monitor TV and a personal computer, connected to each other, according to the present invention.

The picture signal recorded on the magnetic disc 23 is read by the magnetic head 21 and outputted to a play-back amplifier 33 through the selecting switch 19. The picture signal, consisting of a luminance signal and a color signal, is amplified by the play-back amplifier 33, demodulated by an FM-demodulation circuit 35, and processed by an image signal processing circuit 37 so as to be a video signal. The video signal is supplied to an image output terminal 39. Thus, when an image input terminal of a monitor TV 61 (FIG. 4) is connected to the image output terminal 39, the picture (image) can be seen on the monitor TV 61. The magnetic head 21, play-back amplifier 33, FM-demodulation circuit 35 and image signal processing circuit 37 constitute a play-back device.

An operating portion 41 has various switches (not shown) which are connected to the system controller to actuate the commencement and completion of the record and the play-back of the still video apparatus. A display portion 43 indicates various functions of the still video apparatus, such as "RECORDING ON", "PLAY-BACK ON", or the recording track or play-back track, etc. The indication is controlled by the system controller 31.

The construction mentioned above is similar to that of a conventional still video apparatus. The following discussion will be directed to the interface which constitutes one of the most significant features of the present invention.

The output of the FM-demodulation circuit 35 is connected an A/D converter 45, which converts the analog luminance signal and the analog color signal outputted from the FM-demodulation circuit 35 to a digital luminance signal and a digital color signal. The digital signals are outputted to a RAM 47 that operates as a buffer through a data bus. The luminance and color signals for one picture frame are successively written in the RAM 47 for each pixel unit.

Upon the completion of writing the picture signals for one picture frame into the RAM 47, the written luminance and color signals are processed to be digital image signals which can be output to a personal computer, by a digital signal processing circuit 53. The processed digital image signals are successively read and outputted to an interface driver 49 through the data bus.

The interface driver 49 converts the digital image signals outputted from the RAM 47 to predetermined communication standard signals to be outputted to an interface connector 51. The image data signals are output from the interface connector 51. Consequently, if the interface connector 51 is connected to an interface connector of a personal computer 63, the image signals recorded on the magnetic disc 23 are inputted to the personal computer 63 as image information.

An interface line driver 49 can input and output the image data, so that when the image data signals are input thereto through the interface connector 51, the image data signals are output to the RAM 47. The image data signals are successively written into the RAM 47 for each pixel, similar to the play-back operation previously described.

The image data for one picture frame written into the RAM 47 is processed to be digital image signals which can be recorded on the magnetic disc 23, by the digital signal processing circuit 53. The digital image signals are successively read from the RAM 47 and are converted to analog image signals, consisting of the luminance signals and the color signals, by the D/A converter circuit 55 prior to being inputted to the FM-modulation circuit 15.

Similar to the image signals output from the image signal processing circuit 13, the analogue image signals are FM-modulated by an FM-modulation circuit 15, are amplified by the recording amplifier 17 and are recorded in the magnetic disc 23 by the magnetic head 21.

The operations of the A/D converter 45, the RAM 47, the interface line driver 49 and the D/A converter 55 are controlled by the digital signal processing circuit 53. The digital signal processing circuit 53 is usually composed of a microcomputer which actuates the A/D converter 45, writes and reads the data into and from the RAM 47, processes the digital image signals written in the RAM 47, and actuates the interface line driver 49 and the D/A converter 55, in association with the system controller 31. The play-back and recording operations through the interface connector 51 are effected by the operating portion 41. Although the system controller 31 and the digital signal processing circuit 53 are separately provided in the illustrated embodiment, they can be constituted by a same microcomputer.

Although the above discussion has been directed to a still video apparatus having a recording function, the present invention can be applied to a still video apparatus for play-back only, having no recording function, as can be seen from the second embodiment of the present invention, described below and shown in FIG. 2.

Figure 2:
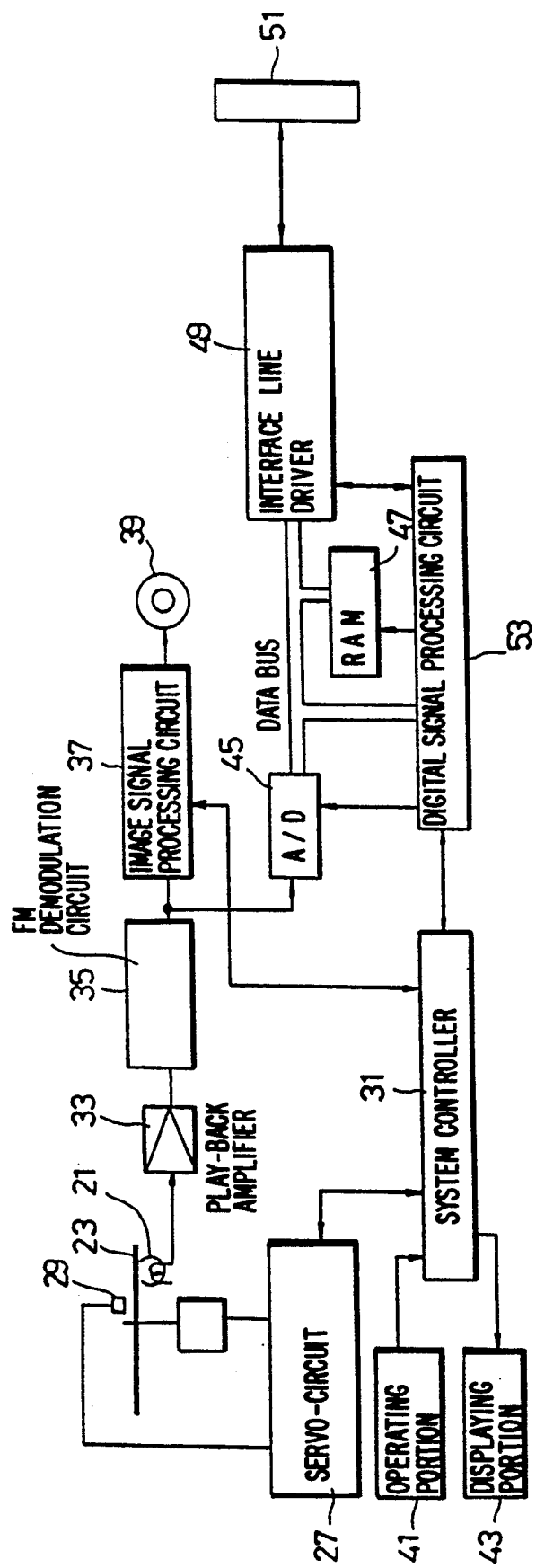
FIG. 2 is a block diagram of a second embodiment of a still video apparatus according to the present invention.

The circuit arrangement of the second embodiment shown in FIG. 2 does not include the image input terminal 11, the image signal processing circuit 13, the FM-modulation circuit 15, the selecting switch 19, and the D/A converter circuit 55. The other construction of the second embodiment is similar to that of the first embodiment shown in FIG. 1. In FIG. 2, the components corresponding to those of the first embodiment shown in FIG. 1 are designated with the same reference numerals.

The composite image signals which are read by the magnetic disc 23 through the magnetic head 21 are amplified by the play-back amplifier 33 and are FM-demodulated by the FM-demodulation circuit 35 to be output to the image signal processing circuit 37 and the A/D converter 45.

The image signals, consisting of the luminance signal and the color signal, are processed to be video signals in the image signal processing circuit 37 and are then output to the image output terminal 39.

The image signals which are output from the FM-demodulation circuit 35 to the A/D converter 45 are converted to digital signals and written into the RAM 47 through the data bus for each pixel.

The digital image signals written in the RAM 47 are processed to be digital image signals which can be output to the personal computer by the digital signal processing circuit 53. The digital image signals are successively read and outputted to the interface line driver 49 through the data bus. In the interface line driver 49, the digital image signals are converted to predetermined communication standard signals to be output to the interface connector 51 as image data signals. If an interface connector of the personal computer 63 is connected to the interface connector 51, the digital image signals are input to the personal computer 63 as image data signals.

Figure 3:
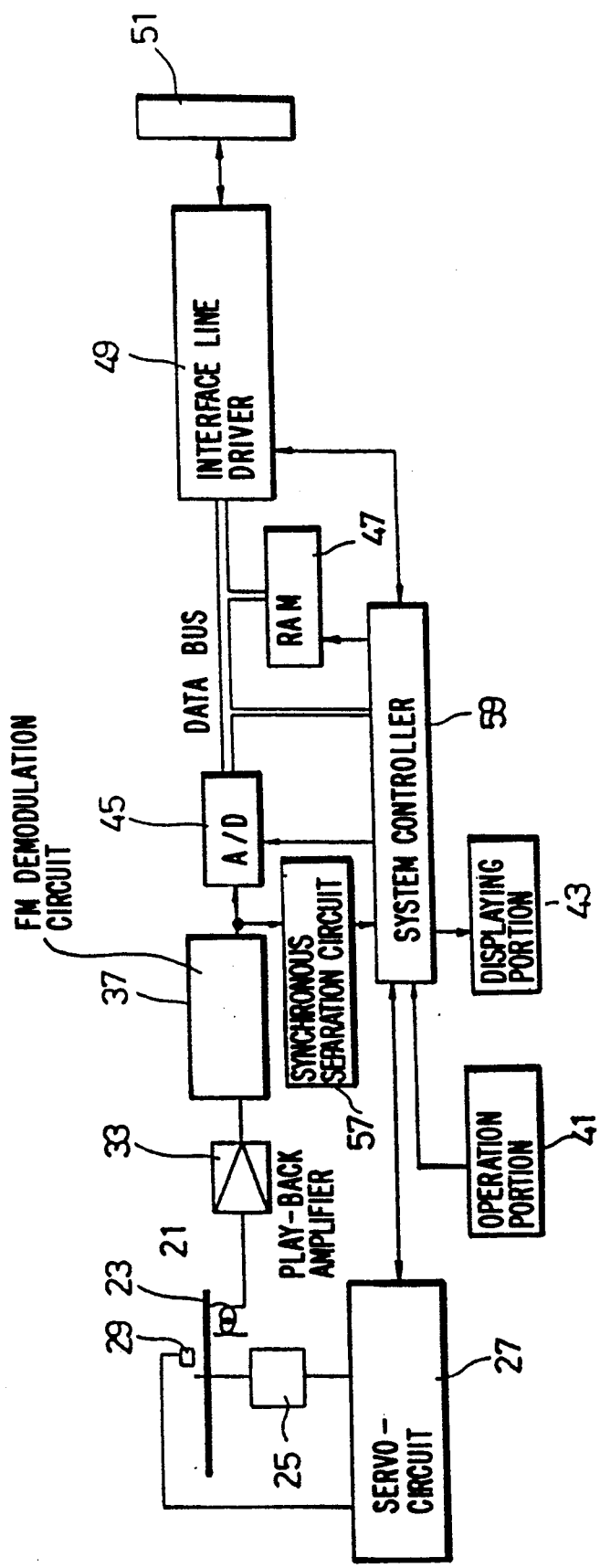
FIG. 3 is a block diagram of a third embodiment of a still video apparatus according to the present invention.

FIG. 3 shows a control circuit according to a third embodiment of the present invention. The third embodiment, shown in FIG. 3, includes an interface for communication with a personal computer, but does not have a normal image output terminal. In FIG. 3, the components corresponding to those in the first or second embodiment are designated with the same reference numerals.

The image signals recorded on a predetermined track of the magnetic disc 23 are read by the magnetic head 21 and output to the play-back amplifier 33, in which the image signals are amplified. The amplified image signals are then FM-demodulated by the image signal processing circuit (FM-demodulation circuit) 37 and inputted; and to the A/D converter 45 and the synchronous separation circuit 57. The image signals inputted to the A/D converter 45 are converted to digital image signals and are successively written into the RAM 47. The synchronous signals are split from the image signals in the synchronous separation circuit 57, so that the synchronous signals are supplied to the system controller 59.

The system controller 59 successively writes the digital luminance signal and the digital color signal which are outputted from the A/D converter 45 into the RAM 47 for each pixel, in accordance with the synchronous signals. The system controller 59 comprises a microcomputer which generally controls the operations of the still video apparatus.

The digital image signals for one picture frame written into the RAM 47 are processed to be digital image signals which can be output to the personal computer, by the system controller 59, and are successively outputted to the interface line driver 49 through the data bus. The digital image signals are converted to predetermined communication standard image signals by the interface line driver 49 and outputted by the interface connector 51.

Since the still video apparatus of the third embodiment, shown in FIG. 3, includes the interface which can input the recorded image signals as image data to an external image processing device, the image signals can be inputted to a personal computer which has no special interface for the image signals.

In the third embodiment, since the image signals are converted to image data which can be input to the personal computer without through the image signal processing circuit 37, the circuit arrangement is simplified, in comparison with the interface for the image data provided in the personal computer, and accordingly, the number of signal processing steps can be decreased, resulting in less deterioration of a picture image.

In the first embodiment, the image data can be recorded in the still video apparatus after various processes, such as the composition of the image data, the insertion of letters, etc. are performed by the personal computer, so that the recorded image data can be seen in the monitor TV or printed out. That is, the still video apparatus can be used as an external image data memory of the personal computer.

In the first embodiment, since the image data can be inputted and outputted the still video apparatus serves as an external data memory for the personal computer, and the pictures taken by a still video camera can be restored after the various image processes are performed by the personal computer.

It should be appreciated that the present invention is not limited to the above mentioned embodiment in which an interface for a personal computer is provided, and can be used with a work station, an office computer, a word processor, a facsimile or other image processing devices which can process image data.

As can be seen from the foregoing, since the still video apparatus of the present invention can communicate with an external image processing device which has no interface for image data, the application of the present invention can be broadened.

APPLICATION TO STILL VIDEO CAMERA

Figure 5:
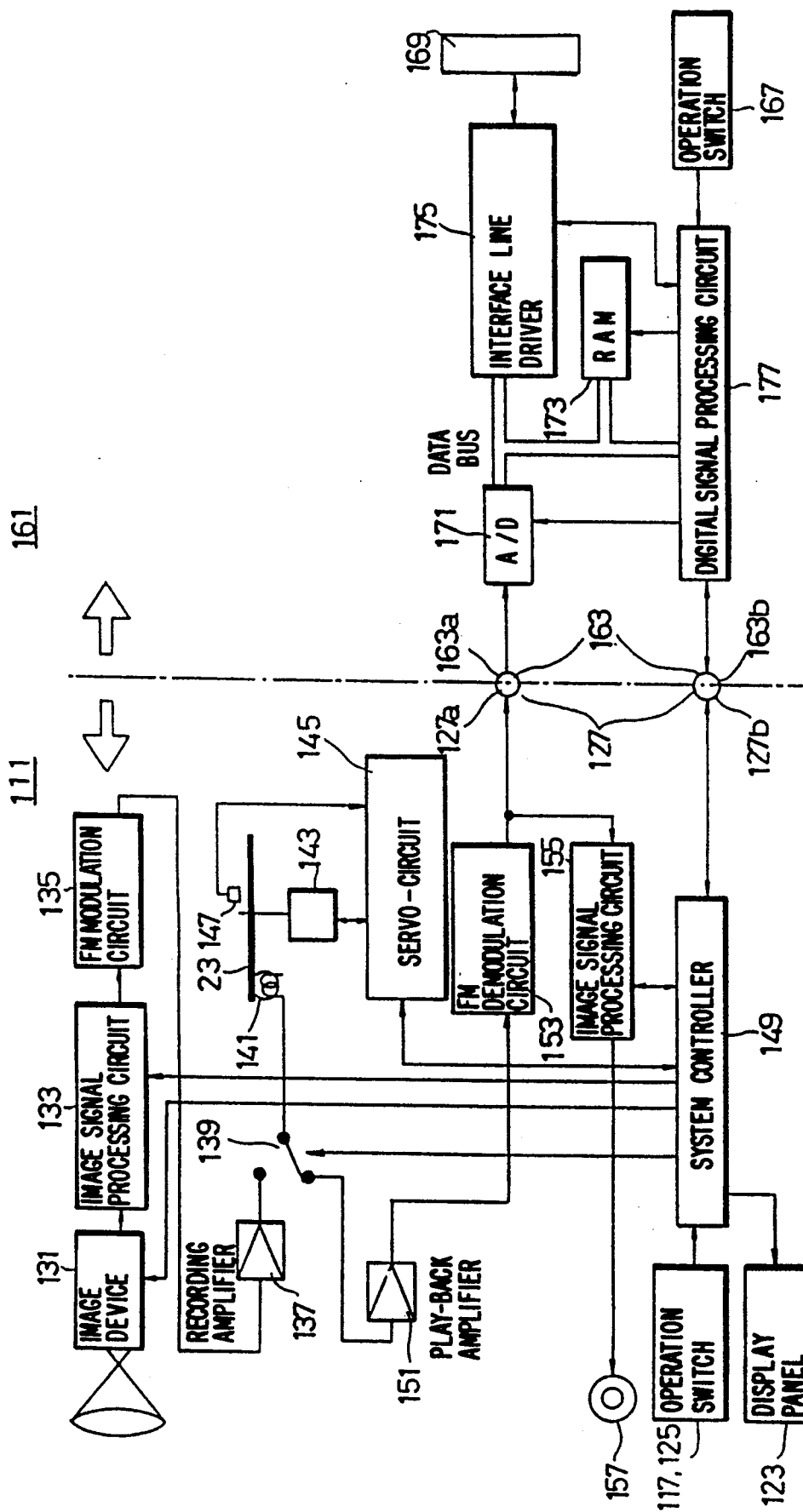
FIG. 5 is a block diagram of an embodiment of a still video camera to which the present invention is applied.
Figure 6:
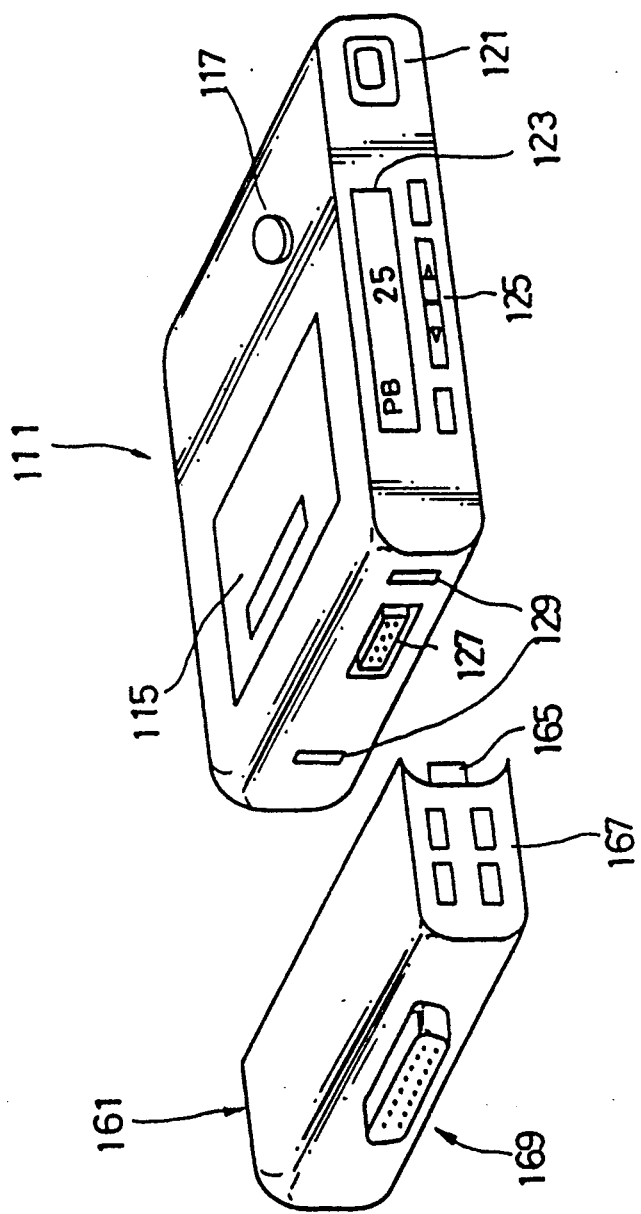
FIG. 6 is a schematic perspective view of the still video camera shown in FIG. 5; and, FIG. 7 is a schematic perspective view of a still video camera and a personal computer connected thereto, according to the present invention.
Figure 7:
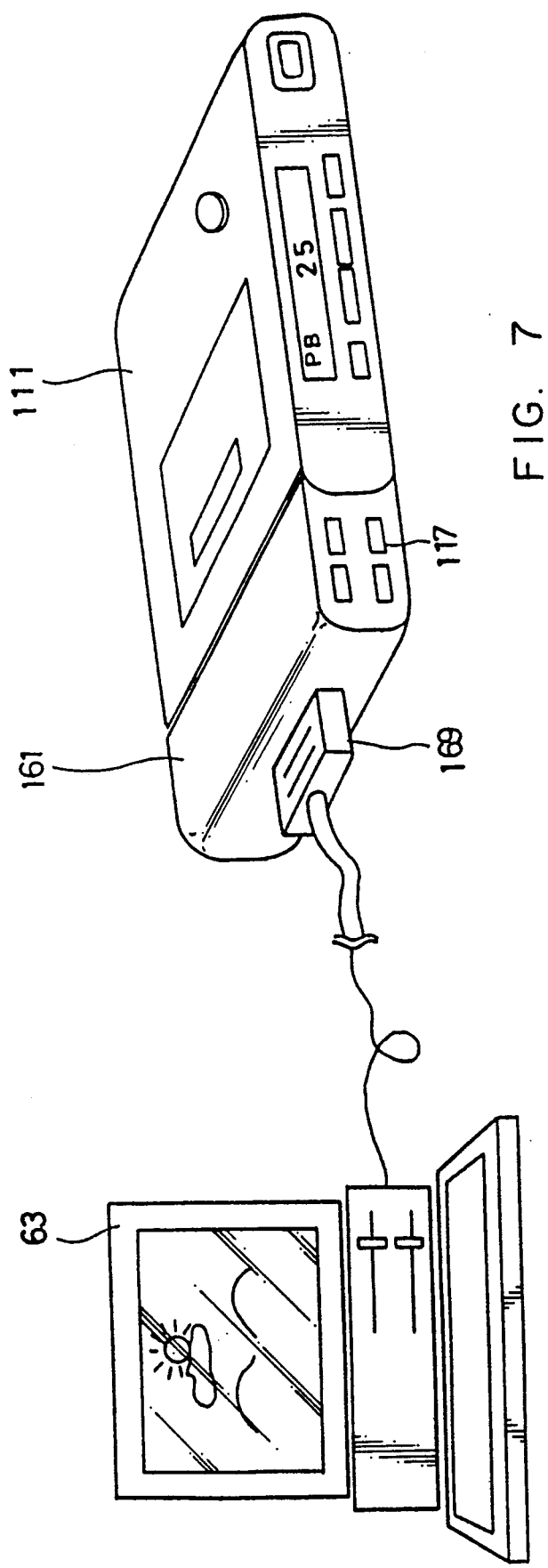

The following discussion will be directed to an embodiment applied to a still video camera (FIGS. 5 to 7).

In FIG. 6, a still video camera has a camera body 111 and an image input/output adaptor 161 which can be detachably attached to the camera body 111. The camera body 111 is provided on its upper surface with a disc cover 115 in which a magnetic disc 23 (FIG. 5) is loaded and a release button 117. The camera body 111 has a photographing lens 119 (FIG. 5) on the front surface thereof. On the rear surface of the camera body 111 are provided a finder (an eyepiece thereof) 121, a display panel 123 for indicating the photographing data, operation switches 125 which set the photographing conditions, the photographing track and the play-back track. On one side face of the camera body 111 is a connector 127 which serves as an image output terminal and connecting member 129.

On the side face of the image input/output adaptor 161 is a connector 163 which can be connected to the connector 127 of the camera body 111 and connecting members 165 which can be fitted in or on the connecting members 129 of the camera body 111 to make the image input/output adaptor 161 integral with the camera body 111. The connecting members 129 and 165 can be detachably connected to each other.

The image input/output adaptor 161 is provided, on its rear face, with operation switches 167 which control a operation and on its opposite side face, with an interface 169 corresponding to the interface for the personal computer.

The following description will be focused on the internal circuit construction of the still video camera shown in FIG. 6 (FIG. 5).

An image of an object to be taken, which is formed on a picture plane of an imaging device 131 by a photographing lens 119 is converted to image signals (luminance signal and color signal) for each pixel unit by the imaging device 131, so that the image signals are supplied to the image signal processing circuit 133 in which the image signals are processed to be an image signal consisting of a luminance signal and a color signal. The image signal is FM-modulated by an FM-modulation circuit 135 and then amplified by a recording amplifier 137. The amplified image signal is supplied to a magnetic head 141 through a selecting switch 139. The image signal is recorded onto a predetermined track of the magnetic disc 23 by the magnetic head 141. The image signal processing circuit 133, FM-modulation circuit 165, recording amplifier 137 and magnetic head 141 form an image signal recording device.

The magnetic disc 23 is driven to rotate by a servo-motor 143 which is in turn driven by a servo-circuit 145. The servo-circuit 145 controls not only the rotation of the servo-motor 143, but also the tracking of the magnetic head 141, in accordance with pulse signals from a PG coil 147.

The composite image signals recorded on the magnetic disc 23 are read by the magnetic head 141 and inputted to play-back amplifier 151 through the selecting switch 139.

The composite image signals amplified by the play-back amplifier 151 are demodulated by an FM-demodulation circuit 153 and are then processed (in an image signal processing circuit 155) through be video signals which are output to the image output terminal 157. When an image input terminal of a monitor TV is connected to the image output terminal 157, the recorded pictures can be seen on the monitor TV. The magnetic head 141, the play-back amplifier 151, the FM-demodulation circuit 153 and the image signal processing circuit 155 form a play-back device.

The image signal processing circuits 133 and 155, the switching operation of the selecting switch 139, the operation of the servo-motor and the tracking by the servo-circuit 145 are controlled by a system controller 149. The system controller 149 usually comprises a microcomputer which generally controls the operations of the components of the still video camera, in accordance with a program stored in a ROM of the microcomputer.

The operation switches 125 and the release switch 117 are connected to the system controller 149. The system controller 149 actuates the selecting switch 139, sets the recording track or the play-back track, and sets the photographing mode to take a picture and record the picture, in accordance with the operation of a release button 125.

The display panel 123 indicates information of various functions of the still video camera, such as "RECORDING ON", "PLAY-BACK ON", the recording track or the play-back track, or the photographing mode, etc. The indication is controlled by the system controller 149.

The above-mentioned construction is similar to the construction of a conventional still video camera. The following discussion will be directed to an image input/output adaptor 161 which is one of the most significant features of the present invention.

The output of the FM-demodulation circuit 153 is connected to an image output terminal 127a of connector 127 as an external output terminal. A control terminal of the system controller 149 is connected to a control terminal 127b of the connector 127. Consequently, image signals (luminance signal and color signal) demodulated by the FM-demodulation circuit 153 are outputted to the image output terminal 127a.

Connector 163 of the image-input/output adaptor 161 has an image input terminal 163a and a control terminal 163b corresponding to the image input terminal 127a and the control terminal 127b, respectively. The image input terminal 163a and the control terminal 163b are connected to an A/D converter circuit 171 and a digital signal processing circuit 177, respectively.

The output of the A/D converter 171 is connected to a RAM 173, an interface line driver 175 and the digital signal processing circuit 177 via a data bus. The digital signal processing circuit 177 comprises a microcomputer which generally controls the operations of the A/D converter circuit 171, the RAM 173 and the interface line driver 175.

A luminance signal and a color signal, outputted from the FM-demodulation circuit 153 are input to the A/D converter circuit 171 through the image output terminal 127a and the image input terminal 163a. The luminance signal and the color signal are converted to digital signals by the A/D converter circuit 171 to be supplied to the RAM 173. The luminance signals and the color signals for one picture frame are successively written into the RAM 173 as pixel units of digital signals.

The digital image signals for one picture frame written in the RAM 173 are processed to be digital image data signals which can be outputted to the personal computer. The digital image data signals are successively read and outputted to the interface line driver 175 through the data bus. The interface line driver 175 converts the digital image signals to predetermined communication standard signals which are fed to the interface connector 169. Namely, the image data signals are output from the interface connector 169. As a result, if the interface connector 169 is connected to an interface connector of a personal computer 63, the picture recorded on the magnetic disc 23 can be input to the personal computer 63 as image data.

The play-back operation, as mentioned above is commenced by operation switch 167 which is connected to the digital signal processing circuit 177. When the communication is commenced by the operation switch 167 the digital signal processing circuit 177 supplies the play-back commencement signal to the system controller 149 through control terminals 163b and 127b. The system controller 149 commences the play-back operation in response to the play-back commencement signal received thereby to read the image signals of one picture frame recorded on the magnetic disc 23 through the play-back device, so that the image signals are output from the image output terminal 127a to the image input terminal 163a.

The image signals inputted to the image input terminal 163a are converted to image data through the A/D converter circuit 171, RAM 173 and interface line driver 175 and are then output from the interface connector 169.

The play-back track is set by the operation switch 117 of the camera body 111 in the illustrated embodiment. Alternatively, the play-back track can be set by the operation switch 167 of the image input/output adaptor 161.

As can be understood from the foregoing, according to the present invention, when the image input/output adaptor 161 is mounted to the camera body 111, recorded image signals can be inputted to the personal computer as image data. The image input/output adaptor 161 can be detached from the camera body 111 to make a normal, compact camera.

In the illustrated embodiment shown in FIG. 5, since the image signals are converted to image data which can be input to the personal computer without through the image signal processing circuit 133, the circuit arrangement is made simpler than the interface for the image data provided in the personal computer, so that the number of the signal processing steps can be reduced, resulting in less deterioration of image signals.

The present invention is not limited to the illustrated embodiments mentioned above and can be variously modified.

For instance, if the output of the imaging device 131 is directly connected to the image output terminal 127a, the taken picture can be directly input to the personal computer without through the magnetic disc 23.

If the camera body 111 has a function for recording image signals from an external device, the image input/output adaptor 161 can be constructed so as to convert the image data from the personal computer to image signals which are inputted to the camera body 111. In this construction, the image processed by the personal computer can be recorded on the magnetic disc 23 and the recorded image can be seen by a monitor TV or printed out.

Furthermore, in the case of a still video camera in which not only picture signals but also sound signals can be recorded, since the image input/output adaptor can be detachably mounted to the camera body, according to the present invention, a separate adaptor which has a sound input/output device incorporated therein can be selectively mounted to the camera body of the still video camera to input and output the sound signals. It is also possible to incorporate the sound input/output device in the image input/output adaptor.

As can be seen from the above discussion, a still video camera according to the present invention can communicate with an external image processing device which has no special interface for the image signals by mounting the image input/output adaptor of the present invention to the camera body. The removal of the image input/output adaptor from the camera body makes it possible to take a picture by a conventional compact camera.

I claim:

1. A still video camera having means for recording an image signal onto a recording medium and play-back means for playing back said image signal recorded onto said recording medium, said camera comprising:
   an interface, incorporated into said camera, which receives and transmits an image data signal from and to an external image processing device; and
   signal converting means, incorporated into said camera, for converting said image signal which is played back by said play-back means to said image data signal and for converting an image data signal inputted to said interface to an image signal which can be recorded onto said recording medium.

2. A still video camera according to claim 1, wherein: said signal converting means comprises an A/D converter which converts said image signal which is played back by said play-back means to a digital image signal, a memory which stores said digital image signal, and a digital signal processing circuit which converts said digital image signal stored in said memory to an image data signal which can be processed by said external image processing device.

3. A still video camera according to claim 2, wherein; said memory comprises a RAM, and said digital signal processing circuit comprises a CPU.

4. A still video camera according to claim 1, wherein: said interface comprises an interface driver which converts said image data signal to a predetermined communication standard signal.

5. A still video camera according to claim 1, wherein: said interface comprises an interface driver which converts a predetermined communication standard signal to said image data signal.

6. A still video camera according to claim 1, wherein: said signal converting means comprises a memory which stores said image data signal which is inputted from said interface, and a digital signal processing circuit which converts the stored image data signal to an image signal which can be recorded onto the recording medium.

7. A still video camera according to claim 1, wherein said recording medium comprises a magnetic disc.

8. The still video camera according to claim 1, further comprising video converting means, incorporated into said camera, for converting said image signal played back by said play-back means to a video signal, said video signal representing the information of said image signal in a standard video format, said camera having image signal output means, connected to an output of said play-back means, for outputting said image signal played back by said play-back means, and further having means for connecting an input of said video converting means to said image signal output means.

9. The still video camera according to claim 8, wherein said image signal output means is connected directly to an input of said signal converting means.

10. A still video camera, comprising:
    a camera body, comprising means for converting an image of an object to be photographed to an electrical image signal, means for recording said electrical image signal onto a recording medium and play-back means for playing back said electrical image signal recorded onto said recording medium; and
    an adaptor which is detachably mounted to said camera body and which comprises signal converting means for converting said electrical image signal played back from said recording medium by said play-back means to an image data signal which can be processed by an external image processing device and an interface which outputs said image data signal to said external image processing device.

11. A still video camera according to claim 10, wherein:

said signal converting means comprises an A/D converter which converts said electrical image signal to a digital image signal, a memory which stores said digital image signal, and a digital signal processing circuit which converts said digital image signal stored in said memory to an image data signal which can be processed by said external image processing device.

12. A still video camera according to claim 11, wherein;
said memory comprises a RAM, and said digital signal processing circuit comprises a CPU.

13. A still video camera according to claim 10, wherein:
said interface comprises an interface driver which converts said image data signal to a predetermined communication standard signal.

14. A still video camera according to claim 10, wherein;
said adaptor further comprises operating means for commencing a play-back operation of said play-back means of the camera body.

15. A still video camera according to claim 10, wherein;
said camera body comprises an external output terminal from which said image signal is output.

16. A still video camera according to claim 15, wherein;
said adaptor has an image input terminal which can be connected to said output terminal of said camera body.

17. The still video camera according to claim 10, further comprising video converting means, incorporated into said camera body, for converting said electrical image signal played back by said play-back means to a video signal, said video signal representing the information of said electrical image signal in a standard video format, said camera having image signal output means, connected to an output of said play-back means, for outputting said image signal played back by said play-back means, and further having means for connecting an input of said video converting means to said image signal output means.

18. The still video camera according to claim 17, wherein said image signal output means is connected directly to an input of said converting means.

19. A still video camera, comprising:
a camera body comprising imaging means for converting an image of an object to be photographed to an electrical image signal; and
an adaptor which is detachably mounted to said camera body and which comprises signal converting means for converting said electrical image signal outputted from said imaging means to an image data signal which can be processed by an external image processing device and an interface which outputs said image data signal to said external image processing device.

20. A still video camera according to claim 19, wherein:
said signal converting means comprises an A/D converter which converts said electrical image signal to a digital image signal, a memory which stores said digital image signal, and a digital signal processing circuit which converts said digital image signal stored in said memory to an image data signal which can be processed by said external image processing device 21. A still video camera according to claim 20, wherein;
said memory comprises a RAM, and said digital signal processing circuit comprises a CPU.

22. A still video camera according to claim 19, wherein;
said interface comprises an interface driver which converts said image data signal to a predetermined communication standard signal.

23. A still video camera according to claim 19, wherein:
said camera body has an external output terminal from which said electrical image signal is output.

24. A still video camera according to claim 23, wherein:
said adaptor has an image input terminal which can be connected to said output terminal of said camera body.

25. The still video camera according to claim 19, further comprising video converting means, incorporated into said camera, for converting said electrical image signal to a video signal, said video signal representing the information of said electrical image signal in a standard video format.

26. The still video camera according to claim 25, wherein said electrical image signal is inputted to said signal converting means before conversion of said electrical image signal by said video converting means.

27. A still video camera having a camera body and image signal output means for outputting an electrical image signal, said camera comprising:
signal converting means for converting said image signal to an image data signal which can be processed by an external image processing device;
video converting means, incorporated into said camera body, for converting said image signal to a video signal, said video signal representing the information of said image signal in a standard video format; and
at least one output terminal, incorporated into said camera body, which outputs a signal derived from said image signal before conversion of said image signal by said video converting means.

28. The still video camera according to claim 27, wherein said derived signal comprises said image signal.

29. The still video camera according to claim 25, further comprising
an interface which outputs said image data signal to said external image processing device.

30. The still video camera according to claim 29, wherein said signal converting means and said interface are incorporated into said camera body.

31. The still video camera according to claim 29, wherein said camera further comprises an adapter which is detachably mounted to said camera body, said adapter comprising said signal converting means and said interface.

32. The still video camera according to claim 27, wherein said signal converting means comprises an A/D converter which converts said image signal to a digital image signal, a memory which stores the converted digital image signal, and a digital signal processing circuit which converts the digital image signal stored in said memory to an in image data signal which can be processed by said external image processing device.

33. The still video camera according to claim 32, wherein said memory comprises a RAM, and said digital signal processing circuit comprises a CPU.

34. The still video camera according to claim 29, wherein said interface comprises an interface driver which converts said image data signal to a predetermined communications standard signal.

35. The still video camera according to claim 27, wherein said still video camera further comprises means for playing back an image signal which is recorded on a recording medium, said signal converting means converting said image signal which is played back from said recording medium by said playing back means to an image data signal which can be processed by an external image processing device.

36. The still video camera according to claim 35, wherein said recording medium comprises a magnetic disc.

* * * * *

UNITED STATES PATENT AND TRADEMARK OFFICE
CERTIFICATE OF CORRECTION

PATENT NO. : 5,231,501
DATED : July 27, 1993
INVENTOR(S) : N. SAKAI

It is certified that error appears in the above-indentified patent and that said Letters Patent is hereby corrected as shown below:

At column 11, line 69 (claim 20, line 10), change "device" to ---device.---.

At column 12, line 66 (claim 32, line 7), delete "in" ( second occurrence).

Signed and Sealed this

Eighth Day of October, 1996

Attest:

BRUCE LEHMAN

Attesting Officer       Commissioner of Patents and Trademarks